US011057306B2

(12) United States Patent
Singh et al.

(10) Patent No.: US 11,057,306 B2
(45) Date of Patent: Jul. 6, 2021

(54) TRAFFIC OVERLOAD PROTECTION OF VIRTUAL NETWORK FUNCTIONS

(71) Applicant: Intel Corporation, Santa Clara, CA (US)

(72) Inventors: Jasvinder Singh, Shannon (IE); John J. Browne, Limerick (IE); Shobhi Jain, Shannon (IE); Sunku Ranganath, Hillsboro, OR (US); John O'Loughlin, Shannon (IE); Emma L. Foley, Killorglin (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/353,730

(22) Filed: Mar. 14, 2019

(65) Prior Publication Data

US 2019/0215272 A1    Jul. 11, 2019

(51) Int. Cl.
*H04L 12/803* (2013.01)
*G06F 9/445* (2018.01)
*H04L 12/851* (2013.01)
*H04L 12/801* (2013.01)
*H04L 12/823* (2013.01)
*H04L 12/859* (2013.01)
*H04L 12/813* (2013.01)

(52) U.S. Cl.
CPC .......... *H04L 47/122* (2013.01); *G06F 9/445* (2013.01); *H04L 47/19* (2013.01); *H04L 47/196* (2013.01); *H04L 47/20* (2013.01); *H04L 47/2408* (2013.01); *H04L 47/2475* (2013.01); *H04L 47/326* (2013.01)

(58) Field of Classification Search
None
See application file for complete search history.

(56) References Cited

U.S. PATENT DOCUMENTS

| | | | | |
|---|---|---|---|---|
| 4,060,735 A | * | 11/1977 | Pascucci | H02J 13/0089 307/3 |
| RE34,036 E | * | 8/1992 | McGeehan | H04B 1/68 375/270 |
| 6,675,024 B1 | * | 1/2004 | Loke | H04B 1/005 455/132 |

(Continued)

OTHER PUBLICATIONS

"Handling of Signaling Storms in Mobile Networks; The Role of the User Data Management System", Ericsson, Mar. 2015.

(Continued)

*Primary Examiner* — Christopher T Wyllie
(74) *Attorney, Agent, or Firm* — Compass IP Law PC

(57) ABSTRACT

Examples include a method of determining a first traffic overload protection policy for a first service provided by a first virtual network function in a network of virtual network functions in a computing system and determining a second traffic overload protection policy for a second service provided by a second virtual network function in the network of virtual network functions. The method includes applying the first traffic overload protection policy to the first virtual network function and the second traffic overload protection policy to the second virtual network function, wherein the first traffic overload protection policy and the second traffic overload protection policy are different.

21 Claims, 7 Drawing Sheets

(56) References Cited

U.S. PATENT DOCUMENTS

| | | | |
|---|---|---|---|
| 6,865,185 B1* | 3/2005 | Patel | H04L 47/12 370/310 |
| 7,573,891 B1* | 8/2009 | Chow | H04B 3/542 370/401 |
| 7,945,678 B1* | 5/2011 | Skene | H04L 45/22 709/227 |
| 9,645,899 B1* | 5/2017 | Felstaine | G06F 11/2025 |
| 9,882,828 B1* | 1/2018 | Sandlerman | H04L 47/74 |
| 10,083,098 B1* | 9/2018 | Balmakhtar | G06F 11/301 |
| 10,085,199 B1* | 9/2018 | Shaw | H04W 24/04 |
| 10,545,778 B1* | 1/2020 | Venkata | G06F 9/45558 |
| 2002/0009051 A1* | 1/2002 | Cloonan | H04L 47/10 370/232 |
| 2003/0061481 A1* | 3/2003 | Levine | H04L 9/0836 713/163 |
| 2004/0090312 A1* | 5/2004 | Manis | H04B 3/54 370/464 |
| 2004/0192227 A1* | 9/2004 | Beach | H05B 47/19 455/90.3 |
| 2005/0068798 A1* | 3/2005 | Lee | H04L 47/6215 365/49.17 |
| 2005/0085259 A1* | 4/2005 | Conner | H04B 3/542 455/552.1 |
| 2006/0271314 A1* | 11/2006 | Hayes | G01R 22/063 702/62 |
| 2007/0002876 A1* | 1/2007 | Berkman | H04B 3/54 370/401 |
| 2007/0076653 A1* | 4/2007 | Park | H04L 12/4633 370/328 |
| 2007/0229231 A1* | 10/2007 | Hurwitz | H04B 3/542 455/402 |
| 2008/0300750 A1* | 12/2008 | Davis | H04B 3/546 701/36 |
| 2009/0228223 A1* | 9/2009 | Liu | G01R 31/008 702/59 |
| 2009/0327384 A1* | 12/2009 | Petrovic | H04B 1/036 708/300 |
| 2010/0254262 A1* | 10/2010 | Kantawala | H04L 47/25 370/232 |
| 2011/0014910 A1* | 1/2011 | Yonge, III | H04L 1/0001 455/434 |
| 2011/0090785 A1* | 4/2011 | Shimizu | H04L 69/14 370/218 |
| 2011/0140911 A1* | 6/2011 | Pant | H04B 3/546 340/870.02 |
| 2012/0242538 A1* | 9/2012 | Hasch | G01S 13/931 342/194 |
| 2012/0281524 A1* | 11/2012 | Farkas | H04L 45/48 370/221 |
| 2013/0121427 A1* | 5/2013 | Sun | H04B 3/54 375/257 |
| 2013/0163429 A1* | 6/2013 | Dunstan | H04L 47/263 370/235 |
| 2014/0148116 A1* | 5/2014 | Alman | H04L 67/2828 455/404.1 |
| 2014/0176340 A1* | 6/2014 | Liang | H04W 12/02 340/870.02 |
| 2014/0226977 A1* | 8/2014 | Jovicic | H04B 10/1149 398/26 |
| 2015/0311721 A1* | 10/2015 | Uppal | H04M 1/72415 700/287 |
| 2015/0365132 A1* | 12/2015 | Yu | H04B 3/54 307/10.1 |
| 2016/0057208 A1* | 2/2016 | Parikh | H04L 65/1046 714/4.11 |
| 2016/0103698 A1* | 4/2016 | Yang | G06F 11/203 714/4.11 |
| 2016/0105255 A1* | 4/2016 | Henry | H04W 72/0453 375/257 |
| 2016/0112263 A1* | 4/2016 | Henry | G01R 31/58 370/250 |
| 2017/0134287 A1* | 5/2017 | Shaw | H04L 47/125 |
| 2017/0289270 A1* | 10/2017 | Li | H04L 41/12 |
| 2017/0331517 A1* | 11/2017 | Henry | H04B 3/542 |
| 2017/0371717 A1* | 12/2017 | Kiess | G06F 9/45558 |
| 2018/0026911 A1* | 1/2018 | Anholt | H04L 41/5003 709/226 |
| 2018/0048689 A1* | 2/2018 | Johnson | H04M 15/73 |
| 2018/0165084 A1* | 6/2018 | Mahimkar | G06F 9/45558 |
| 2018/0191838 A1* | 7/2018 | Friedman | H04M 15/66 |
| 2018/0331960 A1* | 11/2018 | Browne | H04L 47/2441 |
| 2018/0368060 A1* | 12/2018 | Kedalagudde | H04L 47/78 |
| 2019/0007320 A1* | 1/2019 | Sukhomlinov | H04L 45/38 |
| 2019/0045000 A1* | 2/2019 | Hiremath | H04L 49/501 |
| 2019/0081894 A1* | 3/2019 | Yousaf | H04L 45/745 |
| 2019/0149425 A1* | 5/2019 | Larish | G06N 3/0454 706/16 |
| 2019/0190848 A1* | 6/2019 | Zavesky | H04L 47/823 |
| 2019/0199613 A1* | 6/2019 | Jambur Sathyanarayana | H04L 43/16 |
| 2019/0199646 A1* | 6/2019 | Singh | H04L 47/522 |
| 2020/0007445 A1* | 1/2020 | Anwer | H04L 45/74 |

OTHER PUBLICATIONS

CISCO, "Managing VNF Lifecycle Using ETSI API", Cisco Elastic Services Controller 4.5 User Guide, Jun. 10, 2019, 23 pages. Retrieved from internet:https://www.cisco.com/c/en/us/td/docsinet_mgmt/elastic_services_controller/4-5/user/guide/Cisco-Elastic-Services-Controller-User-Guide-4-5/managing_VNF_lifecycle_using_etsi_API.html.

ETSI, "Network Functions Virtualisation (NFV); Management and Orchestration", ETSI GS NFV-MAN 001 v1.1.1, Dec. 2014, 184 pages.

NRG5, Filippo Rebecchi et al., "5G PPP Research and Validation of critical technologies and systems: Enabling Smart Energy as a Service via 5G Mobile Network advances", Deliverable 3.1 Semi-automatic NS/VNF deployment, v1.0, Feb. 2, 2018, 58 pages.

* cited by examiner

TRAFFIC OVERLOAD PROTECTION OF VIRTUAL NETWORK FUNCTIONS

BACKGROUND

Virtual network functions (VNFs) are virtualized tasks formerly carried out by proprietary, dedicated hardware. VNFs move individual network functions out of dedicated hardware devices into software that runs on commodity hardware (e.g., computer servers). These tasks, used by both network service providers (e.g., telecommunications providers called "telcos") and businesses, often include firewalls, domain name system (DNS) services, and caching or network address translation (NAT) services. VNFs typically can run in virtual machines (VMs) on a cloud computing server. VNFs can help increase network scalability and agility, while also enabling better use of network resources. Other benefits include reducing power consumption and increasing available physical space, since VNFs replace additional physical hardware. These benefits also result in reduced operational and capital expenditures.

In the cloud computing data center environment, the packet traffic directed towards specific telco service VNFs can vary dramatically in a short period of time, causing one or more of the following issues. 1) Traffic overloading. When traffic exceeds the processing capacity of a VNF, the service provided by the VNF becomes overloaded, which causes resource exhaustion and disruption, potentially leading to critical services becoming unavailable to customers. 2) Cascaded failure of services. Failure of one VNF instance increases the traffic load on remaining VNF instances and can cause a cascade of failures overwhelming a data center. 3) A single traffic overload mechanism is unaware of different types of services. Applying a uniform, single traffic overload protection policy (for e.g., packet drop, resource scaling, etc.) in the data center when different services have different Quality of Service (QoS) requirements might lead to service level agreement (SLA) violations, thus potentially negatively affecting a promised level of service as defined by customer contracts. For example, dynamic scaling of the resources (e.g., spawning a new VNF instance) in overload conditions might be acceptable for some services but not for services with strict high-availability requirements. This may be due to a large amount of time (e.g., up to several minutes) incurred to deploy new VMs and/or triggering complex reconfigurations of VNFs on one or more servers.

DETAILED DESCRIPTION

Embodiments of the present invention provide a method of handling traffic overload conditions without requiring instrumentation of the VNFs which implement "carrier grade" telecommunications (telco) services with different QoS requirements. Embodiments protect services provided by VNFs from disruptions and failures by applying a traffic overload handling policy based on their QoS requirements in a highly dynamic cloud computing environment. The tolerance for service interruption depends on the type of service. For example, real time services such as voice/video calls are sensitive to dropped packets. Therefore, predicting the traffic overload conditions and starting up a new instance of the VNF might be the best course of action for these kinds of services. In another example, services such as email or web browsing can tolerate multiple service interruptions and can have a more relaxed service availability requirement. Therefore, filtering some of the packets towards other VNFs might be best course of action for these kinds of services.

Embodiments of the proposed invention take into account the type of telco services provided by VNFs to determine the traffic overload policies to apply. Types of traffic overload policies include "packet drop" policies (such as weighted random early detection (WRED) and Head/Tail drop), "no packet drop" policies (for example, predicting the traffic overload conditions and scaling up the resources for instantiating more VNFs), and hybrids of "no packet drop" and "packet drop" policies where a selected "packet drop" policy is used to temporarily reduce the computing system load while new resources (e.g., new instances of VNFs) are being instantiated in order to deter more problems from occurring while computing resources are tied up provisioning the new VNFs, etc.

Some embodiments of the present invention are implemented in a virtual switch (e.g., an Open Virtual Switch (OVS)-Data Plane Development Kit (DPDK), a Tungsten Fabric, an OpenStack load balancer service, etc.), implemented on computer servers having one or more multicore processors. However, embodiments can also be applied to traffic switches/routers implemented on purpose-built devices such as application specific integrated circuits (ASICs), field programmable gate arrays (FPGAs), etc.

Figure 1:
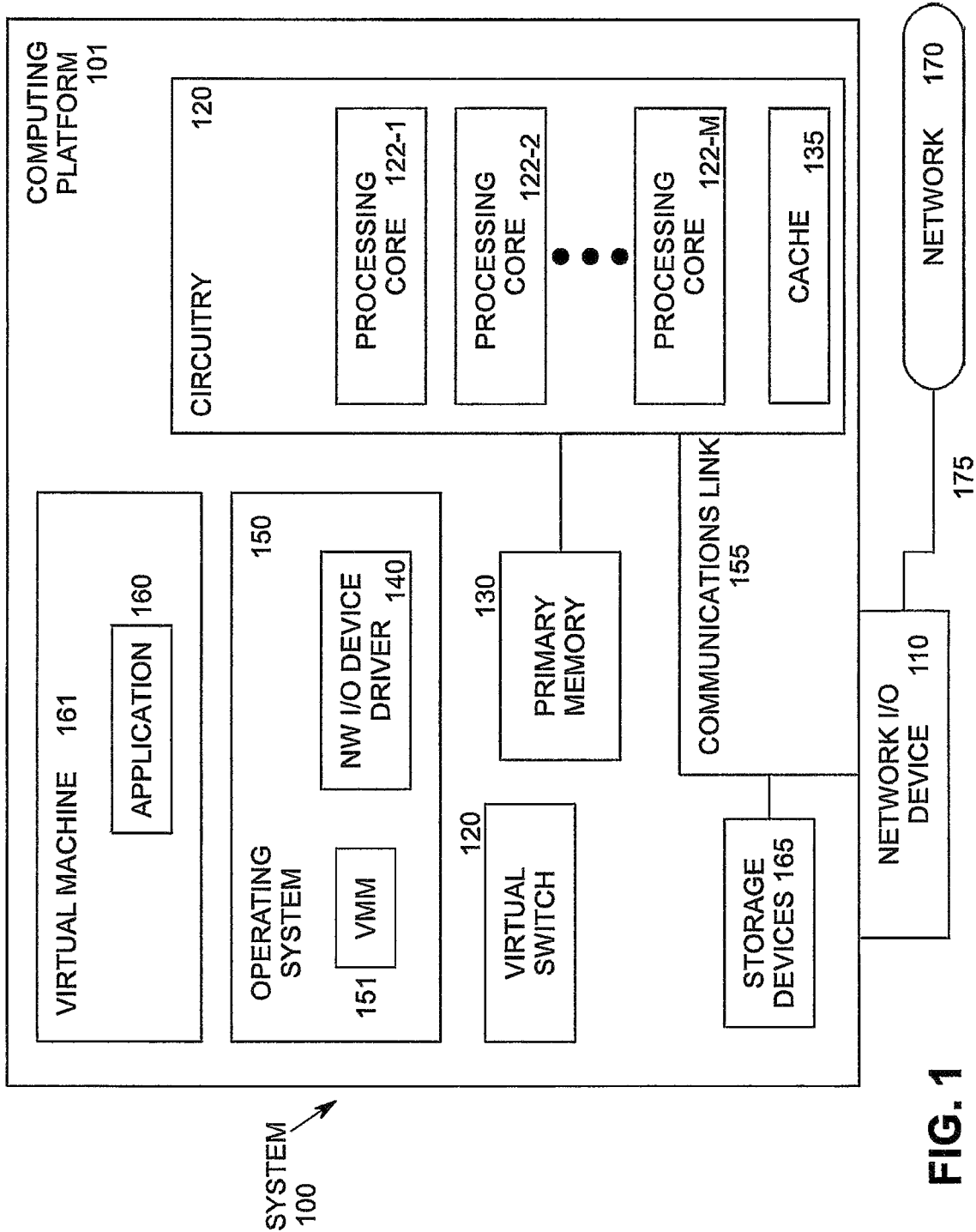
FIG. 1 illustrates an example computing system.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network communication channel 175 includes a PHY device (not shown). In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, at least one application 160 running in a virtual machine (VM) 161, virtual machine manager (VMM) 151, virtual switch 120, and one or more storage devices 165. In one embodiment, OS 150 is Linux™. In another embodiment, OS 150 is Windows® Server. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165.

In at least one embodiment, application 160 is a packet processing application operating in user mode. Computing platform 101 includes virtual switch 120 to send and receive packets to and from destinations external to computing platform 101 or internal to computing platform 101 (e.g., between containers/cores). In an embodiment, virtual switch 120 is an OVS based at least in part on DPDK, which can have a data path in kernel space or user space. In an embodiment, a data path through user space enabled by DPDK may be used.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, VMM 151, virtual switch 120, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-*m*, where "m" is any positive whole integer greater than 2. In an embodiment, OS 150, NW I/O device driver 140, VMM 151, virtual switch 120, VM 161, and application 160 are executed by one or more processing cores 122-1 to 122-*m*.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-*m* may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Embodiments of the present invention regulate the traffic to and from, and between different VNFs by based at least in part on the QoS requirement of the services provided by those VNFs. Since the impact of any traffic overload failure will vary depending on the type of the service provided, the traffic overload protection policies such as packet drop, no packet drop, etc., are applied accordingly. In an embodiment having a plurality of VNFs in a network of VNFs in a computing platform, a first VNF having a first QoS requirement for a first service is assigned a first traffic overload protection policy and a second VNF having a second QoS requirement for a second service is assigned a second traffic overload protection policy, wherein the first QoS requirement is different than the second QoS requirement, the first service is different than the second service, and the first traffic overload protection policy is different than the second traffic overload protection policy.

Figure 2:
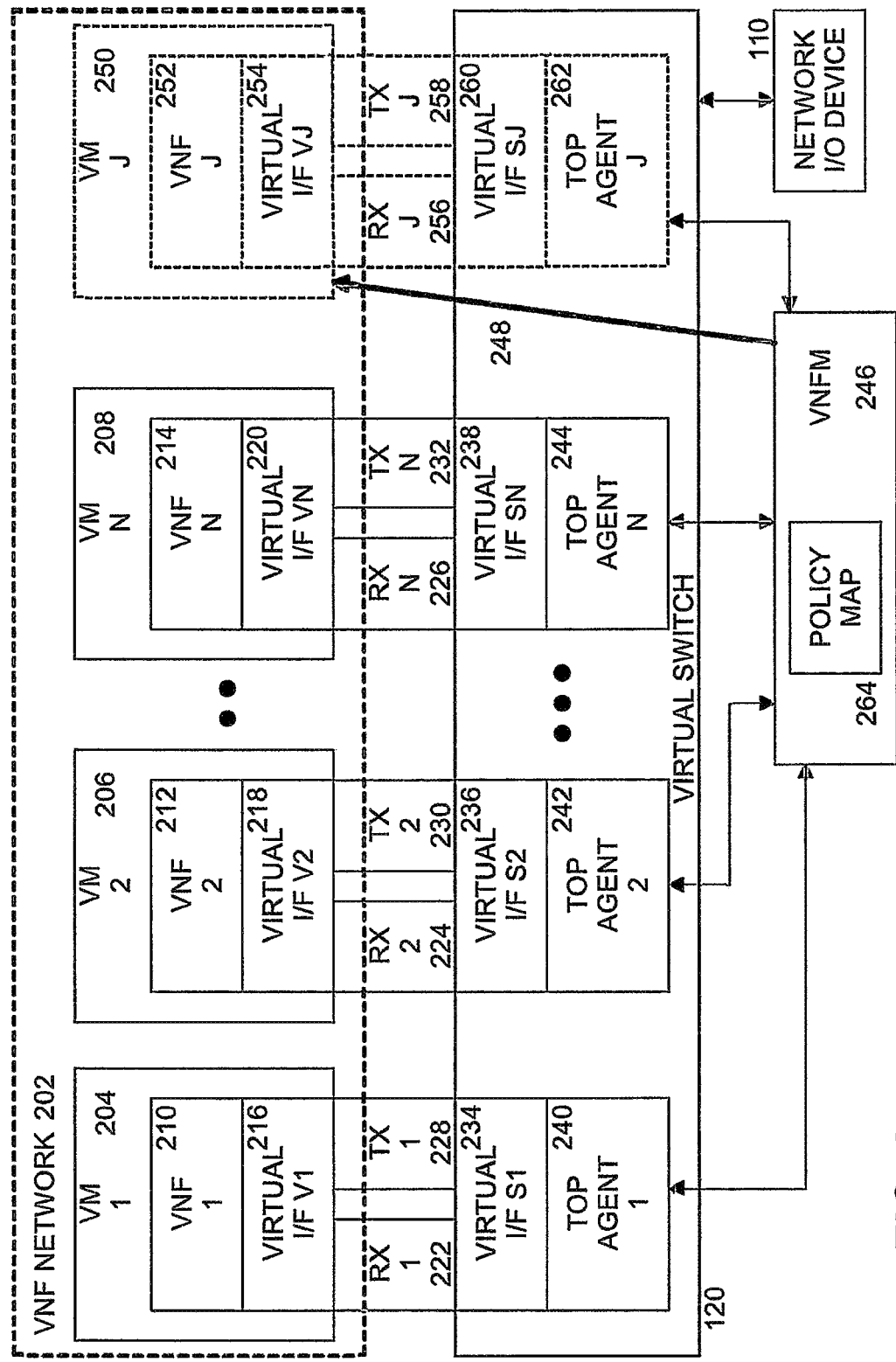
FIG. 2 illustrates traffic overload protection in an arrangement of VNFs according to some embodiments.

FIG. 2 illustrates traffic overload protection in an arrangement of VNFs according to some embodiments. A network of VNFs 202 includes a plurality of VMs, such as VM 1 204, VM 2 206, . . . VM N 208, where N is a natural number. Each VM in VNF network 202 includes at least one VNF, where the VNF provides one or more services to one or more users of computing platform 101. For example, VM 1 204 includes VNF 1 210, VM 2 206 includes VNF 2 212, . . . VM N 208 includes VNF N 214. The services provided by the set of VNFs in VNF network 202 may be the same or different. In this example, each VM includes only one VNF (e.g., a one to one mapping), but in other examples there may be more VNFs than VMs, with VNFs distributed across VMs in any manner. In some arrangements, there can be many VNFs per VM, the VMs can be distributed across multiple computing platforms, and/or there can be at least one instance of virtual switch 120 on each computing platform, wherein the virtual switches communicate with each other across computing platforms.

Each VNF is coupled to virtual switch 120 (which is coupled to network I/O device 110) by a virtual interface (I/F) having a VNF endpoint and a virtual switch endpoint. Each virtual I/F includes a receive (RX) path and a transmit (TX) path. For example, VNF 1 210 includes virtual I/F V1 216 having RX 1 path 222 and TX 1 path 228, VNF 2 212 includes virtual I/F V2 218 having RX 2 path 224 and TX 2 path 230, . . . VNF N 214 includes virtual I/F VN 220 having RX N path 226 and TX N path 232. On the virtual switch side, virtual switch 120 includes virtual I/F S1 234 coupled to RX 1 path 222 and TX path 1 228, virtual I/F S2 236 coupled to RX 2 path 224 and TX path 2 230, . . . virtual I/F SN 238 coupled to RX N path 226 and TX path N 232. In this way VNFs communicate with virtual switch 120 over the virtual interfaces. A virtual switch can also communicate with other virtual switches over network 170.

In embodiments of the present invention, virtual switch 120 includes one or more traffic overload protection (TOP)

agents. Each TOP agent monitors the traffic to a VNF over a virtual interface. For example, TOP agent 1 240 monitors traffic to VNF 1 210 over RX 1 path 222 via virtual I/F S1 234 and virtual I/F V1 216, TOP agent 2 242 monitors the traffic to VNF 2 212 over RX 2 path 224 via virtual I/F S2 236 and virtual I/F V2 218, . . . TOP agent N 244 monitors the traffic to VNF N 214 over RX N path 226 and TX N path 232 via virtual I/F SN 238 and virtual I/F VN 220.

A virtual network function manager (VNFM) 246 is coupled with virtual switch 120 to manage application of traffic overload policies and instantiation of new VNFs. VNFM 246 includes a data structure called a policy map 264 to store information about traffic overload policies and application of the policies to VNFs. In an embodiment, VNFM 246 is integral with virtual switch 120. In another embodiment, VNFM 246 is implemented as a separate component executed by one or more processors 122 of computing platform 101, or on another computer server.

Each TOP agent performs runtime monitoring of the traffic directed towards the respective VNF, and in case of heavy traffic conditions, applies a pre-determined traffic overload policy to protect the VNF from traffic overloading. Examples of policies include: 1) Packet drop policy based on a congestion avoidance mechanism (e.g., WRED, head/tail drop); 2) No packet drop policy where a traffic overload condition is predicted and a notification is sent to the VNFM to allocate processor resources and spawn a new VNF (e.g., instantiates a replica of the service facing the traffic overload); and 3) Hybrid of no packet drop and packet drop policies where a packet drop policy can be used to temporarily reduce the system load while new resources are being instantiated, thereby prevent more overload problems while computing resources are tied up provisioning the new VNFs.

In case of the no packet drop policy, as soon as a traffic overload situation is predicted, the VNF network 202 resources are increased by deploying at least one new VNF instance to accommodate the new workload. However, this may require a longer amount of start-up time (e.g., up to several minutes) which may not be acceptable for some services with a low down-time requirement, therefore, other reactive countermeasures such as the packet drop policies are selected.

A new VNF instantiation 248 is shown in FIG. 2 as VNF J 252. Similar to other VNFs, the new VNF J 252 runs in a new VM J 250 and includes a new virtual I/F VJ 254 coupled to RX J path 256 and TX J path 258. Virtual switch 120 includes new TOP agent J 262 coupled with new virtual I/F SJ 260. In an embodiment, new VNF J 252 is instantiated in an existing VM.

Embodiments of the present invention handle traffic overload conditions, which occur when the network traffic significantly exceeds the processing capacity of VNFs offering different types of telco services. Traffic overload can disrupt already established connections, cause unavailability of services, cause SLA violations, and degrade service performance.

FIG. 2 shows a virtualized environment where virtual switch 120 routes the traffic to the service VNFs VNF 1 210, VNF 2 212, . . . VNF N 214 in VNF network 202. The telco services in the VNFs can have different QoS requirements. For example, network control and real time streaming services require faster failure recovery from the disruption caused by traffic overloading than services such as messaging, email and web browsing. Thus, TOP agents are deployed at the virtual interfaces 234, 236, . . . 238 of virtual switch 120 where each TOP agent applies a pre-determined policy set by VNFM 246 to mitigate the traffic overload on respective VNFs 210, 212, . . . 214.

In an embodiment, VNFM 246 is executed in a dedicated VM in the same cloud computing infrastructure as VNF network 202. In another embodiment, VNFM 246 is executed as a privileged process on a processor of computing platform 101. VNFM 246 is coupled to each TOP agent and is responsible for communicating a traffic overload protection policy for a VNF to the TOP agent for the VNF. VNFM 246 also receives traffic overload notifications from the TOP agent requesting VNFM to expand the resources available in a selected VM with a newly instantiated VNF providing a specific service.

Figure 3:
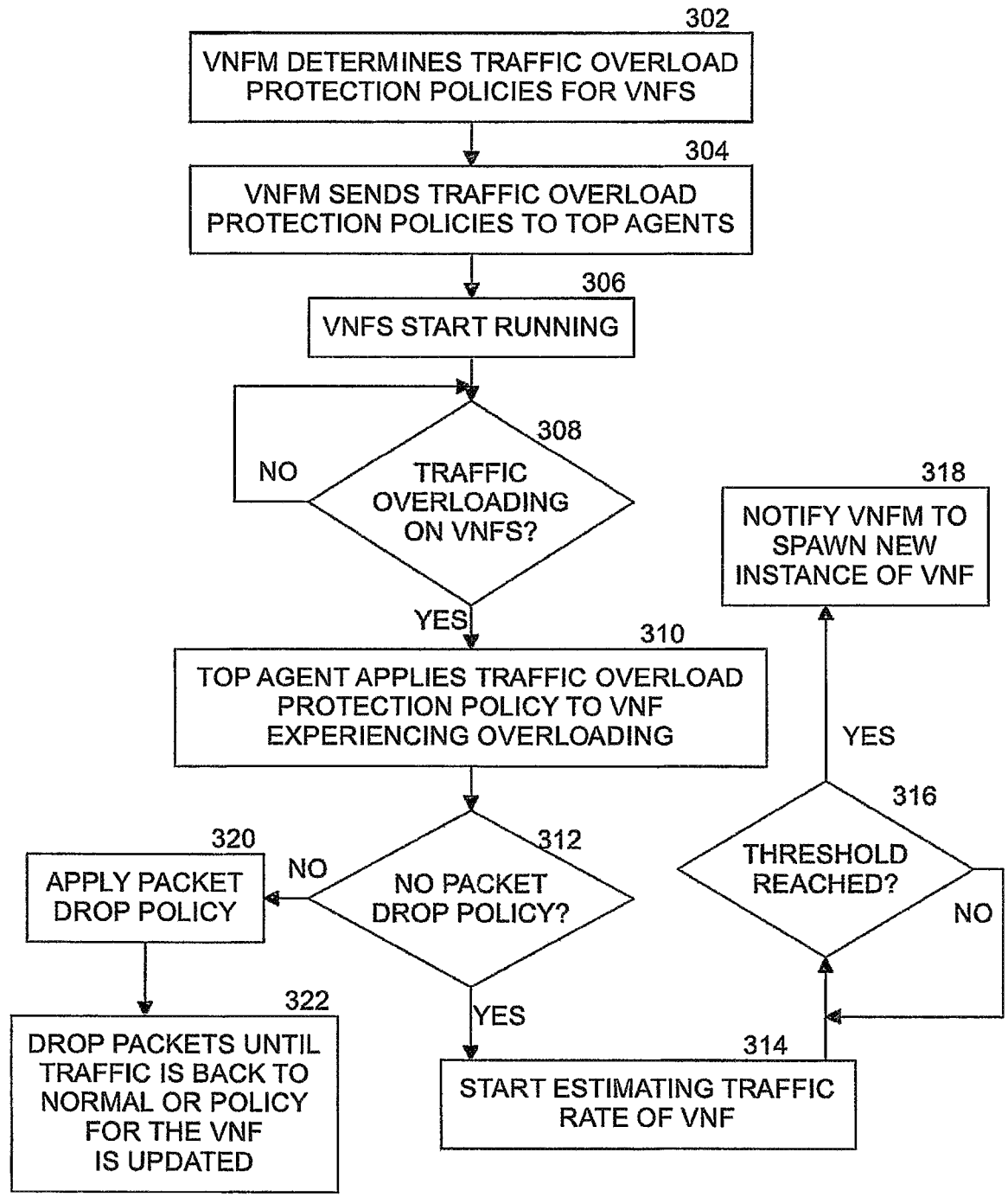
FIG. 3 is a flow diagram of managing traffic overload protection according to some embodiments.

FIG. 3 is a flow diagram 300 of managing traffic overload protection according to some embodiments. At block 302, VNFM 302 determines traffic overload protection policies for the VNFs 204, 206, . . . 208 in VNF network 202. In an embodiment, each VNF supporting a service having a QoS requirement is assigned a traffic overload protection policy for that service. For example, if VNF 1 210 provides real time video call services, VNFM 246 assigns a first traffic overload protection policy to TOP agent 1 240 associated with VNF 1 210. For example, if VNF 2 212 provide email services, VNFM 246 assigns a second traffic overload protection policy to TOP agent 2 242 associated with VNF 2 212. In an embodiment, the first traffic overload protection policy is a no drop packet policy, and the second traffic overload protection policy is a drop packet policy. The determined traffic overload protection policies are stored in policy map 264. At block 304, VNFM 246 sends the determined traffic overload protection policies to TOP agents 240, 242, . . . 244. In an embodiment, block 302 and 304 are performed during an initialization phase before VNF network 202 is established.

At block 306, VNFs start running in VNF network 202 on computing platform 101. Traffic being handled by VNFs is monitored by their respective TOP agents. Each TOP agent operates independently and in parallel. In an embodiment, each TOP agent is a process being executed by a processor. At block 308 each TOP agent determines if a traffic overload is occurring on the Top agent's associated VNF based at least in part on a current packet transfer rate and a maximum traffic rate. If no traffic overload is detected by a particular TOP agent, then processing by the associated VNF continues without change. If a traffic overload is detected by a particular TOP agent, then at block 310 that TOP agent applies the determined traffic overload protection policy to the VNF experiencing the overloading. At block 312, if the traffic overload protection policy for the overloaded VNF is a no packet drop policy, the TOP agent starts estimating traffic rate on the VNF at block 314. As long as a threshold is not reached at block 316, processing by the VNF continues without change. In an embodiment, the TOP agent periodically re-checks the traffic rate against the threshold. If a threshold is reached, at block 318 the TOP agent notifies VNFM 246 to spawn (e.g., instantiate) a new VNF to perform the same service as the VNF experiencing the traffic overload, thereby increasing the capacity of the computing system to process packets. Some of the packets originally intended for the VNF will be routed to the new VNF to thus reduce the traffic overload on the VNF originally experiencing the traffic overload.

At block 312, if a no packet drop policy is not assigned to the VNF experiencing the traffic overload, the TOP agent applies a packet drop policy to the VNF at block 320. At block 322, the TOP agent drops packets for the VNF until the traffic rate is back to normal (e.g., no longer a traffic overload situation) or until the traffic overload protection policy for the overloaded VNF is updated. In some embodiments, blocks 308 through 320 are performed by any TOP agent associated with a VNF experiencing a traffic overload.

Figure 4:
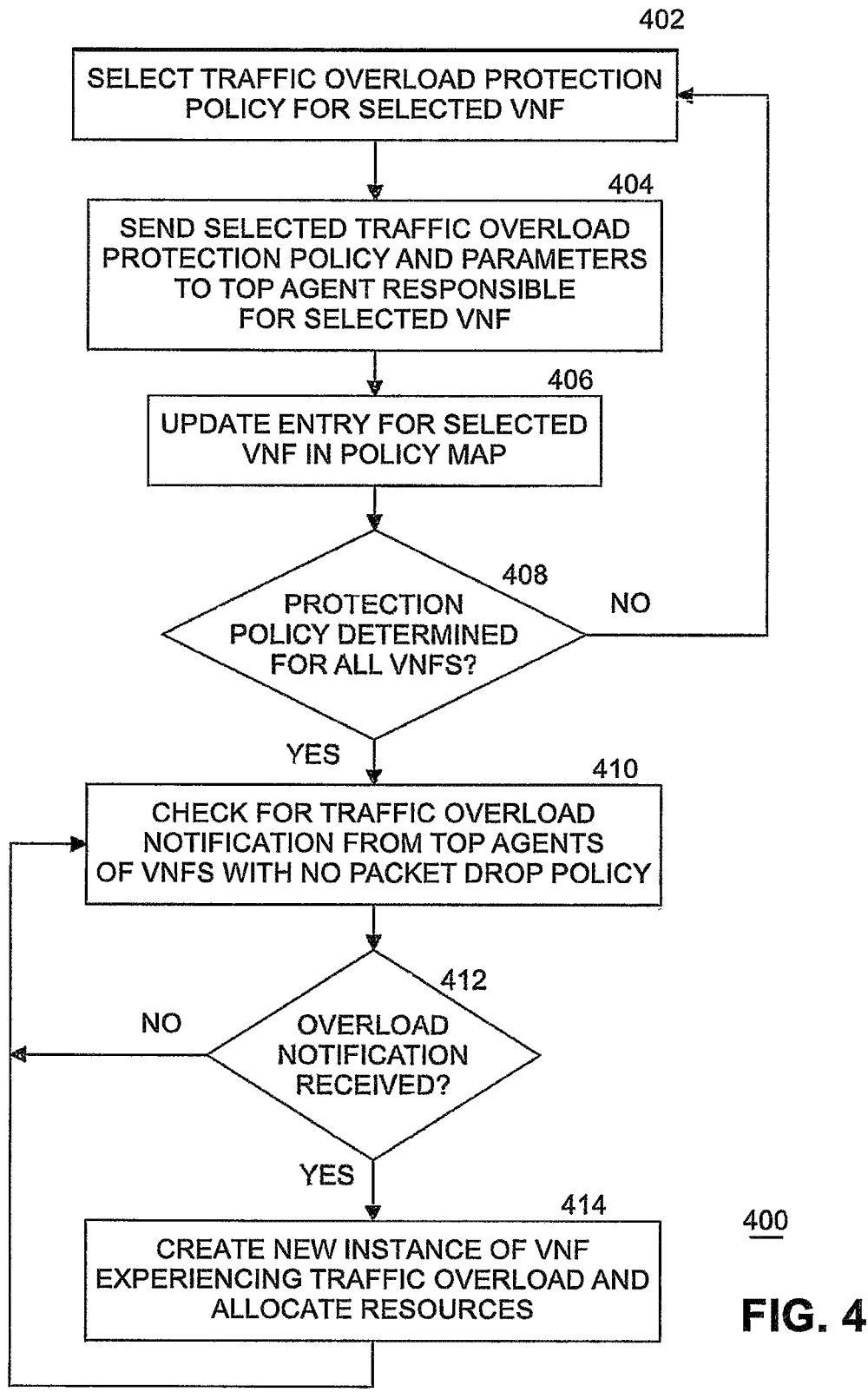
FIG. 4 is a flow diagram of processing by a virtual network function manager (VNFM) according to some embodiments.

FIG. 4 is a flow diagram 400 of processing by a virtual network function manager (VNFM) 246 according to some embodiments. At block 402, VNFM 246 selects a traffic overload protection policy for a selected VNF. In an embodiment, the traffic protection policy is either a packet drop policy or a no packet drop policy. In another embodiment, the traffic protection policy is a hybrid policy. At block 404, VNFM 246 sends the selected traffic protection policy to the TOP agent responsible for the selected VNF. For example, VNFM 246 sends the traffic protection policy for VNF 1 210 to TOP agent 1 240, and so on. In an embodiment, VNFM 246 sends an indicator or identifier of the selected traffic protection policy to the TOP agent instead of complete information about the policy. In this embodiment, the TOP agents are encoded with the details of possible traffic overload protection policies and only need to receive an indicator or identifier of which policy to apply to their VNF. At block 406, VNFM 246 updates an entry in policy map 264 for the selected VNF.

In some embodiments, VNFM 246 prepares the traffic overload protection policy map 264 after initialization of computing platform 101. The policy map defines the traffic overload protection policy for each of the deployed telco services on VNFs taking into account their QoS requirements. Each policy map entry has a unique identifier and includes a VNF identifier (ID), a virtual interface ID, and a traffic overload protection policy. In an embodiment, for each VNF, one of the three protection policies (e.g., packet drop policy, no-packet drop policy, and hybrid policy) is selected.

The packet drop policy employs a congestion avoidance mechanism that is appropriate for the service provided by the VNF. For example, services dealing with transmission control protocol (TCP) packets can employ a WRED congestion avoidance mechanism that can be used as a way to cause TCP to slow down transmission of packets. By randomly dropping packets prior to periods of high congestion, WRED tells the packet source of the TCP connection to decrease its transmission rate. As a result, the packet source decreases its transmission rate until all the packets reach their destination, indicating that the congestion is cleared.

However, for user datagram protocol (UDP) traffic, WRED doesn't offer any benefit, therefore any simple congestion avoidance such as a head/tail-drop mechanism can be used. The no packet drop policy is selected for the services which are sensitive to packet dropping, for example, voice/video calls, online gaming, etc. When the no packet drop policy is selected for any VNF service, the corresponding TOP agent employs a traffic prediction mechanism (for example, an Exponentially Weighted Moving Average (EWMA) filter) to estimate the traffic pressure on the VNF and when an overload is detected, the TOP agent informs VNFM 246 to create a new instance of the service.

At block 408, VNFM 246 checks if a traffic overload protection policy has been determined for all VNFs in VNF network 202. If not, processing continues with a next selected VNF at block 402. If a traffic overload policy has been determined for all VNFs, then processing continues with block 410. At block 410, VNFM 246 checks for any traffic overload notifications received from TOP agents. In an embodiment, VNFM 246 includes a message queue to receive notification messages from TOP agents. At block 412, if no traffic overload notification has been received, the VNFM performs other implementation-dependent processing tasks until a later point in time when processing returns to block 410. If a traffic overload notification is received by VNFM 246 (e.g., during application of a no drop policy), then the VNF agent creates a new instance of the VNF currently experiencing the traffic overload and allocates any necessary system resources at block 414. VNFM processing then continues monitoring for traffic overload at block 410.

During runtime, TOP agents, deployed at the virtual interfaces of service VNFs, monitor the incoming traffic towards the VNFs. If the traffic directed towards a VNF exceeds its capacity, the associated TOP agent applies the predetermined traffic overload protection policy to the VNF as set by VNFM 246. In some embodiments, a one to one mapping is presented between a TOP agent and a service VNF. However, if needed, a single TOP agent can monitor a set of VNFs.

When a TOP agent detects excessive traffic towards a VNF and a packet drop policy is set by VNFM 246, TOP agent applies a congestion avoidance mechanism (for example, WRED, head/tail drop, etc.) before forwarding the traffic to the VNF. In the case when a no packet drop policy is set, the TOP agent continuously monitors the traffic and based on the past traffic volume, estimates the future traffic load. As soon as the traffic load exceeds the allowed threshold, the TOP agent sends information about the overload state of the VNF to the VNFM which mitigates traffic overload situations by providing additional resources (e.g., processors/VMs) and instantiating a new VNF with the same service experiencing the traffic overload.

Figure 5:
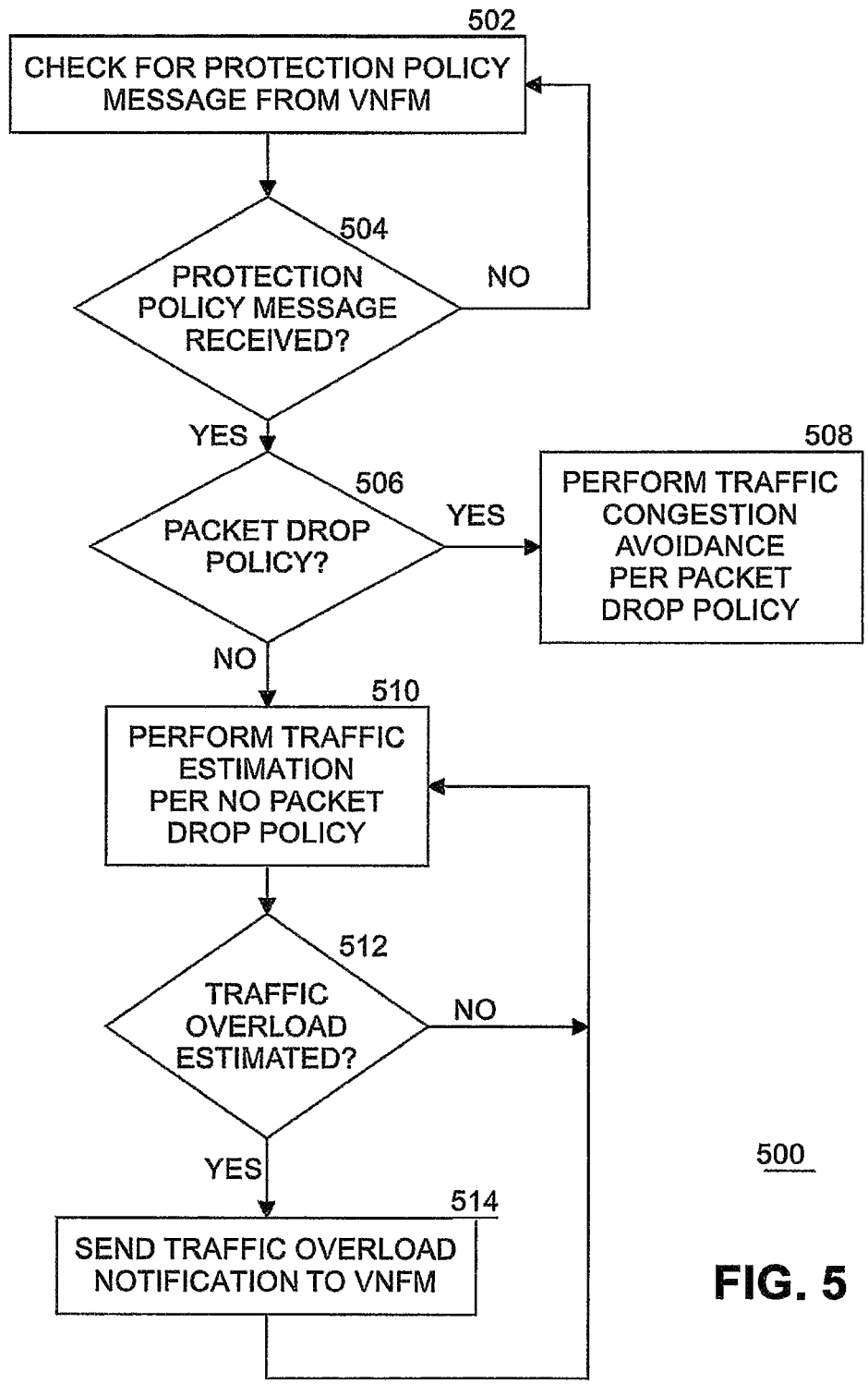
FIG. 5 is a flow diagram of processing by a traffic overload protection (TOP) agent according to some embodiments.

FIG. 5 is a flow diagram 500 of processing by a traffic overload protection (TOP) agent according to some embodiments. At block 502, a TOP agent checks for a traffic overload protection policy message from VNF agent 246. If no protection policy message is received at block 504, processing returns to block 502. If a protection policy message is received, the TOP agent determines if the received protection policy message indicates a packet drop policy at block 506. If so, the TOP agent performs traffic congestion avoidance processing per the packet drop policy at block 508. If a packet drop policy indication is not received in the protection policy message, then in an embodiment a no packet drop policy is received in the protection policy message. In this case, the TOP agent performs traffic estimation processing per the no drop packet policy at block 510. At block 512, if no traffic overload is estimated (e.g., the VNF processing is keeping up with traffic flow), then processing returns to block 510. At block 512, if a traffic overload is estimated, then the TOP agent sends a traffic overload notification message to VNFM 246. During performance of either block 508 or 510, the TOP agent may be interrupted to check for a new protection policy message from the VNFM.

In an embodiment, a hybrid policy (e.g., a mix of packet drop and no packet drop) can applied for services which can tolerance some percentage of packet drop, but not beyond that percentage. If the threshold is crossed, VNFM 246 should be notified to spawn a new VNF instance. In this case, traffic estimation is not performed for spawning the new VNF instance; instead as soon as the threshold for the packet drop policy is reached, VNFM is notified.

Figure 6:
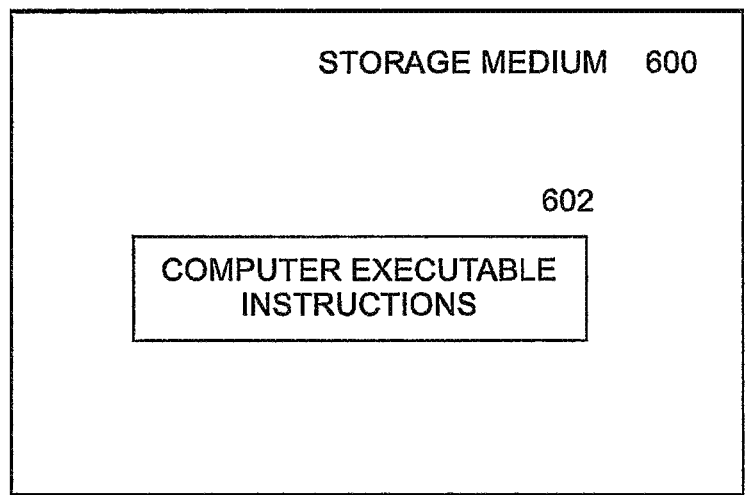
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement logic flows 300, 400, and 500 of FIGS. 3, 4 and 5, respectively. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
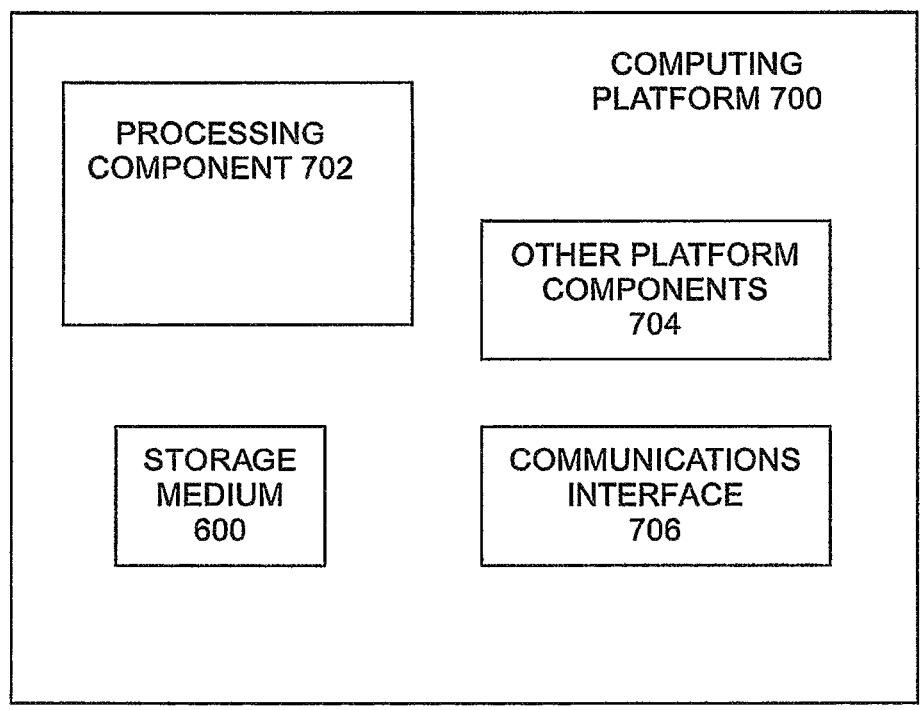
FIG. 7 illustrates another example computing platform.

FIG. 7 illustrates an example computing platform 700. In some examples, as shown in FIG. 7, computing platform 700 may include a processing component 702, other platform components 704 and/or a communications interface 706.

According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining a first traffic overload protection policy for a first service provided by a first virtual network function among virtual network functions executed in a computing system;
   determining a second traffic overload protection policy for a second service provided by a second virtual network function among the virtual network functions executed in the computing system;
   applying the first traffic overload protection policy to the first virtual network function;
   applying the second traffic overload protection policy to the second virtual network function, wherein the first traffic overload protection policy and the second traffic overload protection policy are different;
   in response to traffic overloading the first virtual network function and the first traffic overload protection policy being a first policy and based on a traffic rate to the first virtual network function: instantiating another virtual network function and allocating packets targeted to the first virtual network function to the another virtual network function;
   in response to traffic overloading the second virtual network function and the second traffic overload protection policy being a second policy, dropping packets to the second virtual network function; and
   in response to traffic overloading the first virtual network function and the first traffic overload protection policy being a third policy and based on a traffic rate to the first virtual network function:
      instantiating another virtual network function,
      dropping one or more packets targeted to the first virtual network function while the another virtual network function is being instantiated, and
      routing one or more packets targeted to the first virtual network function instead to the another virtual network function when instantiated.

2. The method of claim 1, comprising:
   determining the traffic rate to the first virtual network function by applying an exponentially weighted moving average (EWMA) filter to packet traffic.

3. The method of claim 1, wherein based on the first traffic overload protection policy being the second policy and packet traffic comprises transmission control protocol (TCP)

traffic, applying weighted random early detection (WRED) congestion avoidance to randomly drop packets targeted to the first virtual network function to reduce traffic congestion.

4. The method of claim 1, wherein based on the first traffic overload protection policy being the second policy and packet traffic comprising user datagram protocol (UDP) traffic, applying head/tail drop congestion to select packets to drop that are targeted to the first virtual network function.

5. The method of claim 1, comprising:
determining the first traffic overload protection policy for the first virtual network function based at least in part on a Quality of Service (QoS) requirement for the first service and
determining the second traffic overload protection policy for the second virtual network function based at least in part on a Quality of Service (QoS) requirement for the second service.

6. The method of claim 1, comprising:
setting the first traffic overload protection policy as the first policy based on the first service processing of one or more of: voice, video, or online gaming.

7. The method of claim 1, comprising:
setting the first traffic overload protection policy as the second policy based on the first service processing of one or more of: email, web browsing content, or messaging.

8. The method of claim 1, wherein the third policy permits packet drops.

9. At least one non-transitory tangible machine-readable medium comprising a plurality of instructions that in response to being executed by one or more processors cause the one or more processors to:
determine a first traffic overload protection policy for a first service provided by a first virtual network function;
determine a second traffic overload protection policy for a second service provided by a second virtual network function, wherein:
a first traffic overload protection agent of a plurality of traffic overload protection agents is to apply the first traffic overload protection policy to the first virtual network function,
a second traffic overload protection agent of the plurality of traffic overload protection agents is to apply the second traffic overload protection policy to the second virtual network function,
the first traffic overload protection policy and the second traffic overload protection policy are different,
in response to traffic overloading the first virtual network function and the first traffic overload protection policy being a first policy and based on a traffic rate to the first virtual network function: notify a virtual network function manager to instantiate another virtual network function and route packets intended for the first virtual network function to the another virtual network function,
in response to traffic overloading the second virtual network function and the second traffic overload protection policy being a second policy, drop packets targeted to the second virtual network function, and
in response to traffic overloading the first virtual network function and the first traffic overload protection policy being a third policy and based on a traffic rate to the first virtual network function:
notify the virtual network function manager to instantiate another virtual network function,
drop one or more packets targeted to the first virtual network function while the another virtual network function is being instantiated, and
route one or more packets targeted to the first virtual network function instead to the another virtual network function when instantiated.

10. The at least one non-transitory tangible machine-readable medium of claim 9, comprising instructions stored thereon that in response to being executed by one or more processors cause the one or more processors to:
determine the traffic rate to the first virtual network function by applying an exponentially weighted moving average (EWMA) filter to packet traffic.

11. The at least one non-transitory tangible machine-readable medium of claim 9, wherein:
based on the first traffic overload protection policy being the second policy and packet traffic comprises transmission control protocol (TCP) traffic, applying weighted random early detection (WRED) congestion avoidance to randomly drop packets targeted to the first virtual network function to reduce traffic congestion and
based on the first traffic overload protection policy being the second policy and packet traffic comprising user datagram protocol (UDP) traffic, applying head/tail drop congestion to select packets to drop that are targeted to the first virtual network function.

12. The at least one non-transitory tangible machine-readable medium of claim 9, comprising instructions stored thereon that in response to being executed by one or more processors cause the one or more processors to:
determine the first traffic overload protection policy for the first virtual network function based at least in part on a Quality of Service (QoS) requirement for the first service and
determine the second traffic overload protection policy for the second virtual network function based at least in part on a Quality of Service (QoS) requirement for the second service.

13. The at least one non-transitory tangible machine-readable medium of claim 9, comprising instructions stored thereon that in response to being executed by one or more processors cause the one or more processors to:
set the first traffic overload protection policy as the first policy based on the first service processing of one or more of: voice, video, or online gaming.

14. The at least one non-transitory tangible machine-readable medium of claim 9, comprising instructions stored thereon that in response to being executed by one or more processors cause the one or more processors to:
set the first traffic overload protection policy as the second policy based on the first service processing of one or more of: email, web browsing content, or messaging.

15. A computing system comprising:
a plurality of traffic overload protection agents, wherein at least one traffic overload protection agent is to provide traffic control for a virtual network function among a plurality of virtual network functions and at least one virtual network function performs a service; and
a virtual network function manager, coupled to the plurality of traffic overload protection agents, to determine a first traffic overload protection policy for a first service provided by a first virtual network function and determine a second traffic overload protection policy for a second service provided by a second virtual network function, wherein:

a first traffic overload protection agent of the plurality of traffic overload protection agents is to apply the first traffic overload protection policy for the first virtual network function, a second traffic overload protection agent of the plurality of traffic overload protection agents is to apply the second traffic overload protection policy for the second virtual network function, the first traffic overload protection policy and the second traffic overload protection policy are different, in response to traffic overloading the first virtual network function and the first traffic overload protection policy being a first policy and based on a traffic rate to the first virtual network function: the first traffic overload protection agent is to notify the virtual network function manager to instantiate another virtual network function and route packets targeted to the first virtual network function to the another virtual network function, in response to traffic overloading the second virtual network function and the second traffic overload protection policy being a second policy, the second traffic overload protection agent is to drop packets targeted to the second virtual network function, and in response to traffic overloading the first virtual network function and the first traffic overload protection policy being a third policy and based on a traffic rate to the first virtual network function: the first traffic overload protection agent is to notify the virtual network function manager to instantiate another virtual network function, drop one or more packets targeted to the first virtual network function while the another virtual network function is being instantiated, and route one or more packets targeted to the first virtual network function instead to the another virtual network function when instantiated.

16. The computing system of claim 15, wherein the first traffic overload protection agent is to determine traffic rates targeted to the first virtual network function by application of an exponentially weighted moving average (EWMA) filter to packet traffic.

17. The computing system of claim 15, wherein based on the first traffic overload protection policy being the second policy and packet traffic comprises transmission control protocol (TCP) traffic, the first traffic overload protection agent is to apply weighted random early detection (WRED) congestion avoidance to randomly drop packets targeted to the first virtual network function to reduce traffic congestion and based on the first traffic overload protection policy being the second policy and packet traffic comprising user datagram protocol (UDP) traffic, the first traffic overload protection agent is to apply head/tail drop congestion to select packets to drop that are targeted to the first virtual network function.

18. The computing system of claim 15, wherein the virtual network function manager is to determine the first traffic overload protection policy for the first virtual network function based at least in part on a Quality of Service (QoS) requirement for the first service and determine the second traffic overload protection policy for the second virtual network function based at least in part on a Quality of Service (QoS) requirement for the second service.

19. The computing system of claim 15, wherein the virtual network function manager is to set the first traffic overload protection policy as the first policy based on the first service comprising processing of one or more of: voice, video, or online gaming.

20. The computing system of claim 15, wherein the virtual network function manager is to set the first traffic overload protection policy as the second policy based on the first service comprising processing of one or more of: email, web browsing content, or messaging.

21. The computing system of claim 15, comprising one or more of: a network interface controller, a memory device, a storage device, wherein the network interface controller is to receive packets that are subject to the first traffic overload protection policy and the second traffic overload protection policy and the memory device or the storage device are to store packets that are subject to the first traffic overload protection policy and the second traffic overload protection policy.

* * * * *